United States Patent Office 3,468,781
Patented Sept. 23, 1969

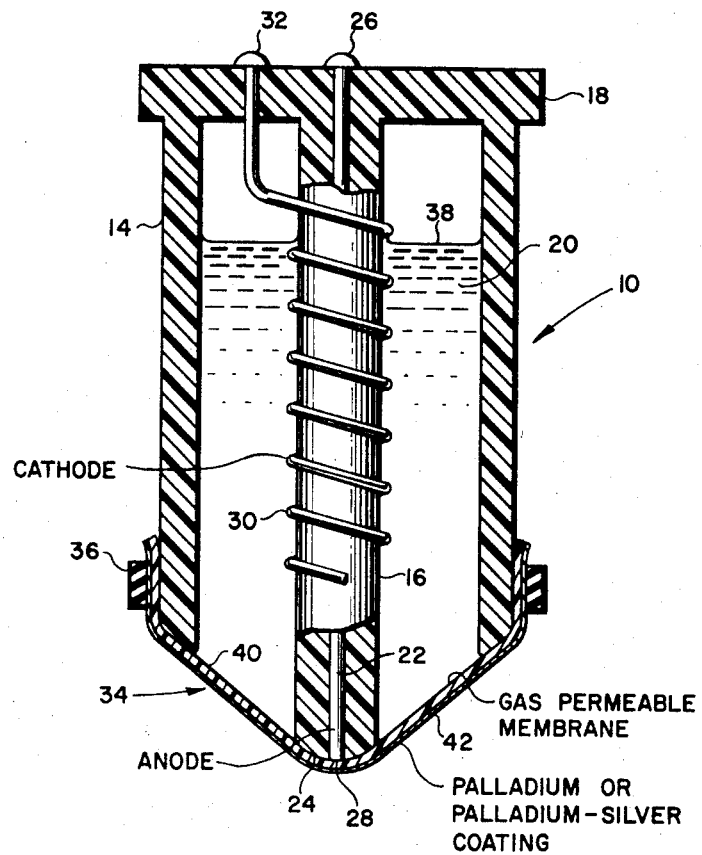

3,468,781
ELECTROCHEMICAL CELL WITH HYDROGEN PERMEABLE BARRIER
Daniel Patrick Lucero, Placentia, Calif., assignor to Beckman Instruments, Inc., a corporation of California
Filed June 17, 1966, Ser. No. 558,489
Int. Cl. B01k 3/10, 1/00
U.S. Cl. 204—195          7 Claims

ABSTRACT OF THE DISCLOSURE

A polarographic cell for determining hydrogen comprising a pair of electrodes joined by an electrolyte and separated from the test medium by a hydrogen permeable barrier. The barrier comprises a gas permeable plastic membrane having a coating of palladium or silver-palladium alloy of a thickness no greater than about 500 A. Such barrier will pass hydrogen and not oxygen at relatively low temperatures.

---

The invention described herein was made in performance of work under a NASA contract and is subject to the provisions of the National Aeronautics and Space Act of 1958, Public Law 85–568 (72 Stat. 426; 42 U.S.C. 2451), as amended.

This invention relates to an electrochemical cell and, in particular, to a polarographic cell employing a hydrogen permeable barrier for measuring the hydrogen content of a test medium.

This invention is an improvement upon the invention disclosed in copending application entitled "Electrochemical Cell" by Roy I. Wilson and Malbone W. Greene, Ser. No. 358,960, filed Apr. 10, 1964, now U.S. Patent No. 3,325,378 and assigned to the assignee of the present application. In said copending application there is described a polarographic cell for measuring the hydrogen content of a test medium. The cell comprises an anode having an etched surface or surface layer of platinum black and a cathode joined by an electrolyte and separated from the test medium by a hydrogen permeable membrane. A predetermined electrical potential is impressed across the electrodes so that when hydrogen diffuses through the membrane into the electrolyte, it depolarizes the cell permitting current to flow as hydrogen is converted to hydrogen ion, said current being a function of the partial pressure of hydrogen in the test medium.

In the polarographic hydrogen cell described in said aforementioned application, the membrane or barrier separating the electrodes of the cell from the sample medium is described as being formed of Teflon, polyethylene or polypropylene. Such membranes are permeable to gases other than hydrogen, including oxygen. I have found that by the use of such membranes, the sensitivity and response characteristics of the polarographic hydrogen cell are adversely affected due to interfering side reactions at the anode of the cell resulting from oxygen diffusing through the membrane into the electrolyte. For example, when a polarographic hydrogen cell is utilized to measure up to about 3% hydrogen in an atmosphere of air, the oxygen in the air produces a 6% error, that is, the signal output of the cell is 6% less than if no oxygen were present in the test medium. I, therefore, concluded that a highly selective barrier that would pass hydrogen and not oxygen into the electrolyte of the polarographic hydrogen cell would eliminate the undesirable oxygen side reactions at the anode, thus providing a cell having increased sensitivity and response characteristics.

Heretofore, the only known barriers which are selectively permeable to hydrogen gas are palladium foil barriers which are utilized for purifying hydrogen gas in process industrial gas streams. Such palladium foil barriers, being about .001 to .003 inch thick, must be operated at relatively high temperatures, on the order of 800° C. in order to exclude constituents other than hydrogen in the process stream. Such barriers would be completely unsuitable for a polarographic hydrogen cell which must operate at temperatures ranging from 15° C. to 25° C. If the palladium foil barriers of the prior art were utilized at 25° C., in a polarographic hydrogen cell, the response of the cell to a step change in hydrogen in the test medium would be about ninety minutes, which obviously would be impractical.

It is, therefore, the principal object of the present invention to provide a highly selective membrane for a polarographic hydrogen cell that will pass hydrogen and not oxygen at relatively low temperatures.

Another object of the invention is to provide an improved polarographic cell incorporating a selective membrane which passes hydrogen and not oxygen thereby increasing the sensitivity and response characteristics of the cell.

According to the principal aspect of the present invention, a barrier which passes hydrogen and not oxygen or other interfering gases or liquids is provided for a polarographic hydrogen cell comprising a gas permeable membrane having a coating of palladium or palladium and silver thereon. Extremely thin coatings of palladium or palladium and silver may be applied to the membrane by vacuum deposition techniques, thus providing a barrier for the polarographic hydrogen cell which permits the passage of hydrogen thereto at relatively low temperatures and excludes oxygen which otherwise causes interfering side reactions at the anode. Also, by the palladium coated membrane, there is provided a barrier which is greatly more impermeable to liquid than the membrane itself, thus preventing the electrolyte in the cell from drying out and thereby extending the life of the cell.

Other objects, aspects and advantages of the invention will become more apparent from the following description taken in connection with the accompanying drawing in which the cell of the invention is shown schematically in longitudinal cross section.

Referring now to the drawing in detail, the polarographic hydrogen cell of the invention is referred to generally by the numeral 10. The cell comprises housing 12 having a cylindrical outer wall 14 and a central body portion 16, both integral with the cap portion 18 closing the upper portion of the housing. The body portion 16 is coaxially located within the housing 12 and spaced from the wall 14 to provide an annular electrolyte chamber 20.

The anode of the cell is in the form of a wire 22 extending lengthwise through the body portion 16 and terminating at the lower end 24 of the body portion with the end of the wire 22 being flush with the end 24 of the body portion. The upper end of the wire 22 terminates in a terminal 26 on the outside of the cap portion 18. As disclosed in the aforementioned copending application, the cathode may be a platinum wire having its end surface 28 either etched or coated with a layer of platinum black. The cathode of the cell is in the form of a silver wire 30 wrapped around the body portion 16 of the cell and having its upper end extending through the cap portion 18 and terminating in a terminal 32.

A barrier, generally designated by numeral 34, is mounted over the lower end of the cell by means of an elastomeric ring 36 to close the electrolyte chamber 20 which contains a suitable electrolyte 38, such as buffered sodium chloride or potassium chloride solution. As seen in the drawing, the barrier 34 is drawn tightly over the end of the cell housing 12 so that its inner surface is in close proximity to the end 24 of the body portion 16 of the cell so as to define an electrolyte film space between the barrier and the end 28 of the anode. The terminals 26 and 32 of the electrodes are connected to a suitable external circuit, not shown, for applying a positive electrical potential to the platinum electrode 22 with respect to the standard hydrogen reference couple, as described in detail in said aforementioned copending application.

In accordance with the invention, the barrier 34 comprises a gas permeable membrane 40 having a coating of palladium or palladium and silver 42 thereon, thus providing a barrier which permits the passage of hydrogen gas but excludes oxygen and other interfering gases and also prevents the evaporation of the electrolyte 38 in the cell.

The preferred membrane material for the barrier 34 is polystyrene, which has the advantage that it has no pinholes therein even when its thickness is as small as 0.3 mil. Another suitable membrane material is Teflon. However, it has the disadvantage that it contains pinholes if it has a thickness less than 3 mils and if a membrane has a thickness of 3 mils or greater to eliminate pinholes, the response of the cell is decreased about tenfold over that of a cell employing a polystyrene membrane having a thickness of 0.3 to 1.0 mil. Other suitable membrane materials include Saran and polyethylene.

In order for the barrier 34 to be permeable to hydrogen at low temperature ranges, that is, at room temperature of about 25° C., it is necessary that the thickness of the palladium coating on the membrane 40 be no greater than about 500 A. If the thickness of the palladium is any greater than 500 A., the signal output of the cell of the invention becomes a function of the coating thickness so that the signal diminishes and the rate of response of the cell decreases to such a degree as to render the cell somewhat impractical for normal applications. The preferred range of the thickness of the coating 42 is about 50 to 200 A. The very thin coating 42 of palladium may be applied to the membrane 40 by vacuum deposition employing electron bombardment techniques to heat the evaporant, palladium.

While a palladium coated membrane provides a barrier for a polarographic hydrogen cell which will not add any significant delay to the rate of response characteristics of the cell, excludes oxygen from the cell and completely prevents the evaporation of liquid electrolyte through the barrier, the palladium coated membrane will crack and rupture when it is exposed to cycles in hydrogen partial pressure over the range of 14 to 20 millimeters of mercury. This is because the pure palladium barrier undergoes a crystalline phase transformation ($\beta$ in which the crystal lattice of the palladium is increased by approximately 15%, thus destroying the ability of the barrier to exclude oxygen. I have found that the $\beta$-phase transformation of the palladium coating is completely eliminated by introducing silver into the palladium. Any amount of silver up to 30% will aid in the elimination of the $\beta$-phase transformation, however 20 to 30% by weight of silver is the optimum for completely eliminating such transformation. Any amounts of silver greater than 30% by weight in the coating would decrease the diffusion characteristics of the coating, thus passing hydrogen gas at a lesser rate and adversely affecting the response characteristics and sensitivity of the cell. Preferably, the silver is added to the palladium coating by utilizing palladium and silver evaporants in a vacuum deposition apparatus employing electron bombardment techniques to heat the evaporants, thus forming an alloy evaporant for the membrane substrate.

By way of example, a palladium coated polystyrene membrane has been formed by vacuum deposition techniques. In such apparatus, the evaporant consisted of a bundle of 5 or 6 palladium wires approximately 0.04 inch in diameter and 1.5 inch in length. On one end of the palladium bundle a filament consisting of thoriated tungsten wire was placed in a circle whose plane was perpendicular to the electron bombardment source. The evaporant was at a positive potential relative to the filament and thus would draw electrons to it. The electron bombardment occurred at a potential of approximately 500 volts and electron current of 230 milliamps. A shield was positioned over the evaporant and filament in order to minimize the temperature of the polystyrene substrate, which would otherwise crinkle and rupture when heated over 75° C. The polystyrene substrate was heated to 30° C. with the shield positioned over the evaporant and filament until an equilibrium condition was reached for the evaporation rate. Upon reaching such equilibrium, the shield was removed for approximately 10 to 15 seconds and then closed. The filament current was turned off and the apparatus was allowed to cool. This procedure was repeated several times in order to obtain a coating of approximately 75 to 100 A. thick on the substrate.

The vacuum pressures utilized in this operation were approximately $10^{-6}$ torr at the beginning of the deposition and approximately $5 \times 10^{-6}$ torr at the end of the operation.

Silver-palladium alloy coated polystyrene barriers have been formed in a similar fashion as described above except that there were provided two evaporants, one being a bundle of palladium wires and the other a bundle of silver wires. The evaporants were set up with a molybdenum or tantalum sheet separating them but the separation was minimized in dimension so as to ensure uniform mixing of the palladium and silver vapors. A shield was placed over the evaporants until a steady evaporation was reached at which point the shield was removed and the plastic membrane was exposed to the evaporants.

Palladium and palladium-silver coated polystyrene membranes, formed in accordance with the above methods, have been produced which attenuate the oxygen flow through the membrane to approximately 1 to 2% of original flow and the barriers do not attenuate the hydrogen flow to any noticeable degree. Polarographic hydrogen cells employing such barriers have been found to have time constants which vary between 600 milliseconds to several seconds without the adverse effect resulting from side reactions normally caused by oxygen passing through an uncoated membrane. The barriers also prevent the passage of water vapor, thus preventing the electrolyte in the cells from evaporating and thereby extending greatly the life of the cells.

While the coating 22 is preferably formed of pure palladium or pure palladium and silver alloy, it is possible that other metals may be employed therein, such as platinum. Coatings of 5 to 15 A. of platinum have been deposited by vacuum deposition techniques on the palladium and palladium-silver coated polystyrene membranes with no adverse effects being observed. However, there are certain metals, such as gold and silver, which have an adverse effect on the ability of the palladium films to restrict passage of gases other than hydrogen.

While the drawing shows the coating 42 on the outside surface of the membrane 40, it may be on the inside of the membrane if the coating is separated from the anode, such as by a wafer of porous paper or plastic.

Although several embodiments of the invention have been disclosed herein for purposes of illustration, it will be understood that various changes can be made in the form, details, arrangement and proportions of the various parts and materials in such embodiments without departing from the spirit and scope of the invention as defined by the appended claims.

What is claimed is:

1. In an electrochemical cell for polarographic analysis of hydrogen in a test medium, the cell having an anode and a cathode adapted to be joined by an electrolyte and having a barrier permeable to hydrogen and substantially impermeable to the electrolyte positioned so as to separate the electrodes and electrolyte from the test medium, the improvement in which said barrier is a gas permeable plastic membrane having a coating of palladium thereon of a thickness no greater than about 500 A.

2. An electrochemical cell as recited in claim 1 wherein said coating includes silver, said silver being present in an amount no more than 30% by weight.

3. An electrochemical cell as set forth in claim 2 wherein said coating includes 20 to 30% by weight of silver.

4. An electrochemical cell as set forth in claim 2 wherein said coating is a silver-palladium alloy.

5. An electrochemical cell as set forth in claim 1 wherein said membrane is polystyrene.

6. An electrochemical cell as set forth in claim 5 wherein said membrane has a thickness between 0.3 and 1.0 mil.

7. An electrochemical cell as set forth in claim 1 wherein said coating has a thickness between about 50 and 200 A.

References Cited

UNITED STATES PATENTS

| | | | |
|---|---|---|---|
| 2,540,152 | 2/1951 | Weller | 55—16 |
| 2,958,391 | 11/1960 | De Rosset | 55—16 |
| 3,113,080 | 12/1963 | Andrus | 204—129 |
| 3,116,355 | 12/1963 | Oswin | 136—86 |
| 3,241,298 | 3/1966 | Pierce | 55—16 |
| 3,325,378 | 6/1967 | Greene et al. | 204—195 |
| 3,344,582 | 10/1967 | Merrill et al. | 55—16 |

JOHN H. MACK, Primary Examiner

T. TUNG, Assistant Examiner

U.S. Cl. X.R.

55—16; 117—138.8; 204—282, 296